United States Patent [19]
Harris

[11] 3,920,982
[45] Nov. 18, 1975

[54] CONTINUOUS FIBER OPTICAL TRANSMIT AND RECEIVE TERMINAL

[75] Inventor: Jay H. Harris, Seattle, Wash.

[73] Assignee: The United States of America as represented by the Secretary of the Navy, Washington, D.C.

[22] Filed: Feb. 8, 1974

[21] Appl. No.: 440,894

[52] U.S. Cl. .......... 250/199; 178/DIG. 2; 332/7.51; 350/96 B; 350/96 WG; 350/161

[51] Int. Cl.$^{2}$ .......... H04B 9/00

[58] Field of Search .......... 250/199, 227; 332/7.51; 350/96 B, 96 WG, 161 R; 178/DIG. 2

[56] References Cited

UNITED STATES PATENTS

| | | | |
|---|---|---|---|
| 3,645,603 | 2/1972 | Smith | 350/149 |
| 3,655,261 | 4/1972 | Chang | 350/96 WG |
| 3,700,900 | 10/1972 | Herliekson | 250/199 |
| 3,717,769 | 2/1973 | Hubbard et al. | 250/199 |
| 3,827,000 | 7/1974 | Matsushita et al. | 332/7.51 |

OTHER PUBLICATIONS

"Fast Acousto-Optical Waveguide Modulators"–Manhar L. Shah, Applied Physics Letters, Vol. 23, No. 2, July 15, 1973, pp. 75–77.

*Primary Examiner*—Robert L. Griffin
*Assistant Examiner*—Marc E. Bookbinder
*Attorney, Agent, or Firm*—R. S. Sciascia; G. J. Rubens; J. W. McLaren

[57] ABSTRACT

An optical transmit and receive terminal controllably couples light energy out of a continuous fiber optic bundle by positioning a controllable acoustic energy source for transferring acoustic energy into the fiber optics to change its refractive index and thus diffract a portion of the transmitted light energy out of the continuous fiber optics without interrupting or severing any of the light transmitting fibers. A portion of transmitted light modulated with signal information may thus be diffracted out of a continuous fiber optic bundle for detection of the information contained therein without in any way interrupting the continuity of the optical fibers. In another mode of operation light energy transmitted along the continuous fiber optical path may be modulated with signal information by applying the signal information to control the acoustic energy source and accordingly diffract modulated amounts of light out of the continuous optical fibers so that the remaining light which continues to be transmitted along the fiber optic path is modulated commensurately with the signal information.

9 Claims, 3 Drawing Figures

CONTINUOUS FIBER OPTICAL TRANSMIT AND RECEIVE TERMINAL

BACKGROUND OF THE INVENTION

Many current developments include the use of fiber optic techniques and more particularly the use of fiber optics to transmit signal information such as in communications systems, for example. One major difficulty encountered both in present and currently contemplated fiber optics communications systems is the undesirable power loss due to optical scattering at the input and output of the various multiple terminals customarily incorporated in such systems. Such terminal losses are particularly undesirable inasmuch as they represent a compounding of losses in addition to those losses of light energy which are due solely and entirely to the line loss inherent in the fiber optic material itself. Thus, it can readily be appreciated that such losses may impose unnecessarily severe and strigent restrictions on the overall capabilities of fiber optic communication systems and severely limit the extent to which such systems may find practical application.

In many fiber optic systems bundles of optical fibers are employed to transmit light energy. Where such fiber optic bundles are employed, one of the prior art methods of creating input and output terminals was to sever a selected predetermined number of fibers so that the ends of the severed fibers could be brought out from the bundle. The severed fibers of the fiber optic bundle constituted a terminal from which transmitted light energy might be received or, alternatively, through which light energy could enter for transmission along the fiber optic path of the fiber optic bundle. However, it is apparent that the technique of severing fibers to create input and output terminals along the length of a fiber optic bundle is inherently limited as to the number of such terminals which may be created dependent upon the number of fibers included in the fiber optic bundle.

Additionally, such prior art type of terminals was limited by its nature to the extraction of light energy from only those particular fibers which were chosen to be severed and brought out to create a particular terminal.

Similarly, where severed fibers were used as an input terminal, light energy entered the communication system by application to the severed fibers and then, for the entire length of the fiber optical path of which they were a part, traversed essentially only those particular severed fibers.

Moreover, relatively high power losses due to optical scattering were encountered in optical communications systems using the described prior art techniques at the input and output of various terminals incorporated in such a system. These disadvantages and undesirable characteristics were the inherent result of severing one or more of the fibers in a fiber optic bundle.

Furthermore, such prior art techniques which involved severing the fiber to provide a terminal along a fiber optical path, could not find practical application in an optical communications system which envisaged the use of a single fiber.

Thus, there is a need for a method and means to provide transmit and receive terminals for fiber optic paths without severing or creating any discontinuity in any of the fibers of such fiber optic paths. Manifestly, such a method and means will permit a large number of terminals along a fiber optic communication line without incurring undue and intolerable power loss due to optical scattering at the input and output of such multiple terminals.

SUMMARY OF THE INVENTION

The present method and means conceives the development of input or output signals at a plurality of transmit and receive terminals along the length of a fiber optic path which may comprise a single long fiber or a fiber optic bundle. In accordance with the concept of the present invention, where the fiber optic path is enclosed in a protective outside covering, sheathing, or cladding a sufficient amount of the protective covering is removed to expose the single fiber or a selected number of fibers in a fiber optic path.

The fiber or fibers so exposed in a fiber optic path are then positioned proximate to an acoustic source so that acoustic energy may be controllably coupled into the continuous fiber optic path. Acoustic energy coupled into the fiber optic path causes a consequent change in the refractive index of the fiber optic path so that there is a spatial variation in refractive index which acts to scatter light energy traversing the fiber optic path. When the wavelength components of the refractive index are sufficiently short, the light so scattered will emerge from the fiber optic path.

Such emergent light energy which is effectually extracted from its transmission along the fiber optic path constitutes a receive terminal; where the light energy traversing the fiber optic path has been previously modulated with signal information, the emergent light caused to be extracted from the fiber optic path, in accordance with the concept of the present invention, will contain signal information sufficient for detection.

However, the most highly desirable functions of terminals of a multiplexing type on a fiber optic path are two-fold and include signal transmission as well as signal reception. The concept of the present invention contemplates that light energy transmitted along the fiber optic path may be modulated as desired to include signal information by means of controlling the acoustic energy source in accordance with the signal information which it is desired to impress upon the fiber optic path; thus, optical energy traversing the terminal is caused to be partially diffracted out of the fiber optic path in amplitudes and at frequencies commensurate with the signal information. Consequently, when such modulated light is received at another terminal along the fiber optic path it includes the desired signal information as contained in such modulation.

In the preferred embodiment of the present invention an acoustic transducer, which may desirably be of the electrically actuated and controlled type, is positioned in close proximity to the exposed fiber or fibers of the fiber optic path. When employed as a receiving terminal, a suitable photo-sensitive element is also positioned in close proximity to the exposed fiber optic path, and substantially opposite the acoustic energy source.

Additionally, in a preferred embodiment of the present invention, an optically reflective means may be provided and positioned between the exposed fibers and the acoustic energy source for reflecting incident light to the photo-sensitive means. Also, a second optically reflective element may be positioned between the fiber optic path and the photo-sensitive element, with a suitable opening therein providing a window for the reception of diffracted light energy by the photo-sensitive element.

In a variant preferred embodiment of the present invention, a plurality of acoustic transducers are spaced along the exposed portion of the continuous fiber optic path and actuated at a phase related sequential rate commensurate with the average velocity of the light energy transmitted along the continuous fiber optic path. Such multiple acoustic transducers may be suitably supported on a substrate material to maintain their most desirable disposition relative to the exposed portion of the fiber optic path. This provides an increased diffracting effect in accordance with the concept of the present invention.

A further variant of the method and system of the present invention provides an acoustic reflector positioned at a predetermined distance from the exposed fiber portion of the fiber optic path and operatively coacting with an acoustic energy source which is angularly disposed for producing multiple reflections of acoustic energy between the acoustic reflector and the exposed fibers of the continuous fiber optic path. This latter variant embodiment of the present invention desirably gives effect to nearly co-linear acousto-optic interaction.

Accordingly, by its nature the concept of the present invention includes a method and means for creating improved, multiplexing, receive and transmit terminals along a fiber optic path.

It is a primary object of the present invention to provide such multiplexing, transmit, and receive terminals at selected points of a fiber optic path without severing or causing an optical discontinuity in any part of the fiber optic path.

An equally important object of the present invention is to provide such method and means of establishing receive and transmit terminals along a fiber optic path which is readily adaptable to an optical path comprised of a single fiber or a fiber optic path comprising a multiple fiber optic bundle.

Another most important object of the present invention is to provide such receive and transmit terminals for a fiber optic path which serves to diffract light energy out of a fiber optic path at rapid rates in the transmit mode of operation and at relatively slow rates for the receive mode operation.

Yet another most important object of the present invention is to provide such multiplexing receive and transmit terminals along the length of fiber optic path which, when not operative in either the receive or transmit mode, will not interfere with, impede, nor attenuate the transmission of light energy along the fiber optic path.

A further object of the present invention is to provide such receive and transmit terminals which, because of desirable operation and advantageous features, will permit the use of a large number of such terminals along a fiber optic path.

A concomitant object of the present invention is to provide such receive and transmit terminals along a fiber optic path without necessitating severing or causing any optical discontinuity of any of the fibers, thus increasing the reliability of operation of the fiber optic path and the transmission of signal energy.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
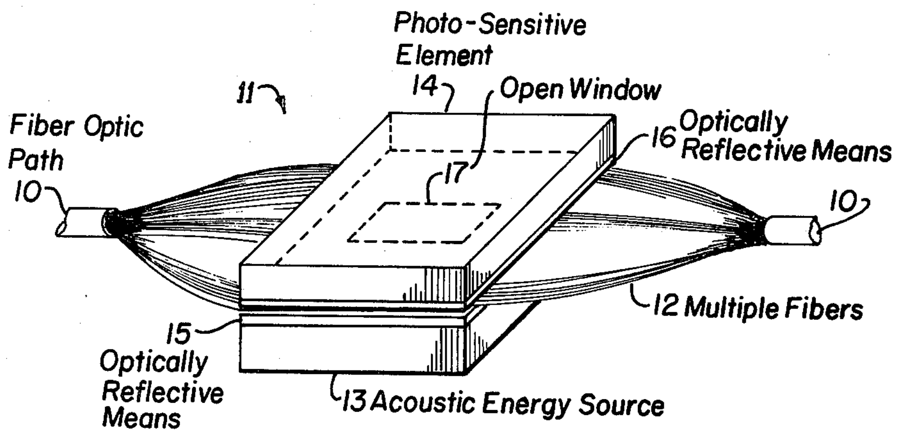
FIG. 1 is a perspective view of an embodiment of the present invention.

FIG. 1 illustrates an embodiment of the present invention in which a fiber optic path 10 includes multiple fibers enclosed in a protective covering, sheath, or cladding jacket. A portion of the fiber optic path 10, the extent of which is indicated by the bracket 11, has the protective covering or sheathing which may comprise a plastic jacket, for example, removed to expose the multiple fibers 12. In the illustration of FIG. 1 the exposed multiple fibers have been separated and spread so that they are disposed and aligned in flat side-by-side relationship.

An acoustic energy source 13 is positioned in close proximity to the fibers 12 of the fiber optic path 10 so that acoustic energy may be coupled into the material of the fibers 12. The acoustic energy source 13 may comprise a suitable bulk wave generator, such as a lead zirconate electrical acoustic transducer, generating the acoustic waves as required in accordance with the concept of the present invention.

Opposite to the acoustic energy source 13 an appropriate photo-sensitive element 14 is positioned to receive light diffracted out of the fibers 12 of the fiber optic path. When a relatively high frequency acoustic wave passes into the fibers 12 from the acoustic energy source 13, a change in refractive index occurs in the material of the fibers 12 by reason of what is termed the acousto-optic or elasto-optic effect, causing diffraction of transmitted light out of fibers 12.

The exposed continuous fibers, aligned side-by-side as contemplated by the present invention and positioned between a source of acoustic energy 13 and a photo-sensitive element 14, constitute essentially a combined acoustic and optical cavity. Accordingly, the optical cavity may be desirably provided with a suitably optically reflective means 15 which may take the form of a thin metal reflector, for instance. Consequently, optical energy which is scattered out of the fibers 12 by reason of being acted upon by the acoustic energy source 13 and a consequent change of refractive index within the fibers 12, will be reflected and redirected by the reflector 15 toward the photo-sensitive element 14.

Additionally, a second optically reflective means 16 may be positioned between the photo-sensitive element 14 and the fibers 12 of the fiber optic path, and provided with an open portion or window 17, (as indicated by the dash lines) through which optical energy may be received by a suitable photo-sensitive means such as a photo-diode, for example. Thus, optical energy which is caused to be scattered out of the fibers 12 by reason of the change of refractive index resulting from acoustic waves controllably generated by the acoustic energy source 13, may be reflected several times between the two optically reflective elements 15 and 16 before being received through the window 17 by the photo-sensitive means 14.

The embodiment illustrated in FIG. 1 has been described in terms of its operation as a receive terminal under the premise that light energy is proceeding along the fiber optic path and has been previously modulated with signal information which it is desired to detect. Accordingly, in the foregoing described mode of operation, signal information contained in the modulated optical energy will be detectable by reason of the signal modulated light energy being partially diffracted out of the fiber optic path 10.

Since the concept and embodiment of the present invention is that of a multiplex device, its alternate mode of operation provides a transmit function. For example, in the embodiment of FIG. 1, unmodulated light energy transmitted along the fiber optic path 10 may be modulated with signal information by applying the signal information to control the amplitude and frequency variations of the acoustic energy applied to the exposed fibers 12 by the acoustic energy source 13. Commensurate amounts of light will be diffracted out of the fibers 12 so that the remaining light transmitted along the electro-optic path 10 will be modulated in accordance with the signal information.

Figure 2:
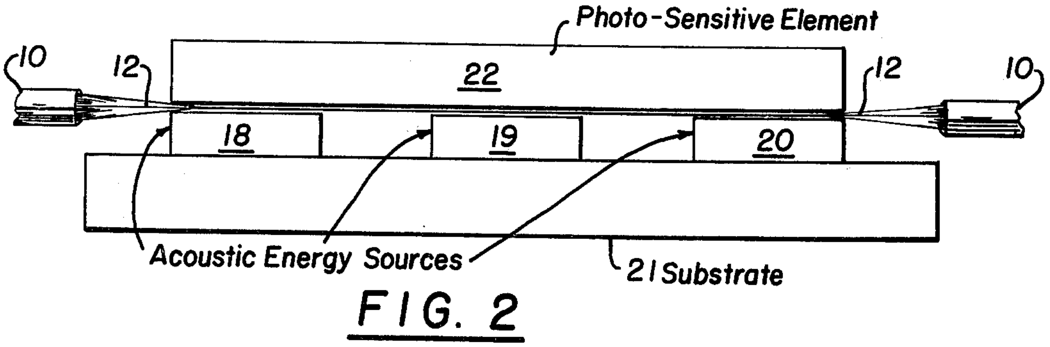
FIG. 2 is a side view of a variant preferred embodiment of the present invention employing multiple acoustic transducers.

FIG. 2 is a side view illustration of a variant preferred embodiment of the present invention employing multiple acoustic energy sources. The disposition of the fiber optic path 10 and the uncovered fibers 12 as illustrated in FIG. 2 may be substantially the same as that shown in FIG. 1 with the exposed fibers 12 being disposed in flat side-by-side alignment. Multiple acoustic energy sources 18, 19, and 20 are spaced from each other substantially in the manner illustrated, and supported on a suitable substrate 21. Opposite the multiple acoustic energy sources, 18, 19, and 20, a photo-sensitive means 22 is disposed much in the manner of the like photo-sensitive element 14 illustrated in FIG. 1.

In accordance with the concept of the present invention, the multiple acoustic energy sources 18, 19, and 20, which may take the form of appropriate electro-acoustic transducers, are adapted to be actuated at a sequential rate commensurate with the average velocity of the light energy transmitted along the continuous fiber optic path 10. As a consequence, increased diffraction can be generated along the exposed multiple fibers 12 with a consequent greater amplitude of signal output detectable by the photo-sensitive element 22.

Figure 3:
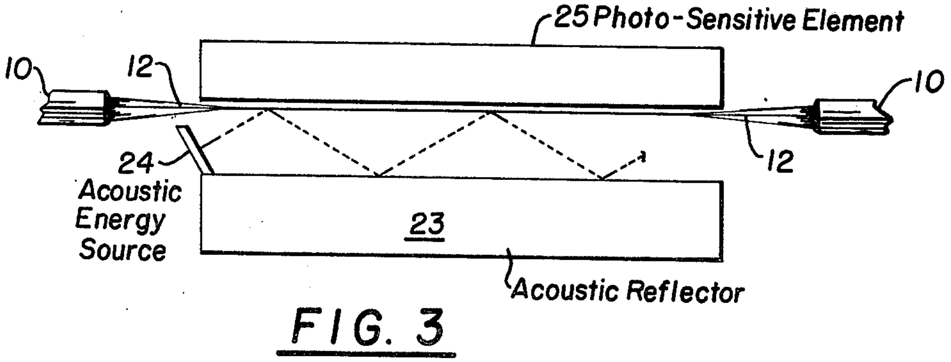
FIG. 3 is a side view of another embodiment of the present invention employing an acoustic reflector coacting with an acoustic energy source.

FIG. 3 illustrates an alternative embodiment of the present invention utilizing multiple reflection of acoustic energy. In FIG. 3 the fiber optic path 10 and the exposed fibers 12 are disposed and arranged preferably in much the same manner as that illustrated in FIGS. 1 and 2. However, in the particular embodiment of the present invention illustrated in FIG. 3, the acoustic energy source is arranged differently.

An acoustic reflector 23 is spaced a predetermined distance from the fibers 12 of the fiber optic path 10 and an acoustic energy source 24, which may take the form of a suitable electro-acoustic transducer, is angularly disposed at or near the end of the acoustic reflector 23 for producing multiple reflections of acoustic energy between the acoustic reflector 23 and the exposed fibers 12 of the continuous fiber optic path 10 as indicated by the dash-line path of the acoustic energy.

The particular configuration illustrated in FIG. 3 has the advantageous capability of producing substantially co-linear acoustic-optic interaction, i.e. the multiple reflections of acoustic energy take effect along a direction which is substantially co-linear with the principal axis of the continuous fiber optic path and thus provides enhanced performance of the concept of the present invention. A suitable photo-sensitive element 25 is provided to sense the light energy output provided by the described acoustic-optic interaction for detecting such signal information as may be contained in the light energy.

It will be appreciated by those knowledgeable and skilled in the pertinent arts that, while the illustrations of FIGS. 1, 2, and 3 have shown the acoustic energy source and the photo-sensitive element employed in the concept of the present invention in opposed disposition, it is fully within the contemplation of the present invention that an acoustic energy source in the form of a suitable electro-acoustic transducer be employed separately at a transmit terminal to modulate light energy passing along a continuous fiber optic path without the use of a photo-sensitive element disposed in opposite spatial position.

Thus, when light energy is transmitted along a continuous fiber optic path it may be suitably modulated with signal information of digital, coded, or other appropriate form by the acoustic-optic interaction. The resulting diffraction of a portion of the light energy out of the continuous fiber optic path in accordance with, and in response to, an electrical signal applied to the source of acoustic energy in the form of an appropriate electro-acoustic transducer gives effect to the desired modulation.

Those skilled in the pertinent arts will fully appreciate that the concept of the present invention provides a preferred multiplexing optical transmit and receive terminal which is capable of significantly enhanced performance in the two-fold functional modes of signal transmission and signal reception.

Moreover, the concept of the present invention inherently provides the highly advantageous feature which avoids severing any fiber element in a fiber optic path, whether it consist of a single fiber or a fiber optic bundle. The avoidance of any optical discontinuity in the fiber optic path affords a significantly reduced power loss due to optical scattering at the multiplex terminals of the present invention and a resultant higher efficiency in their use and of the overall system.

Additionally, the concept of the present invention is such that when the terminals (regardless of their number) are not operative to perform signal transmission or signal reception functions, they do not interfere in any way with the effective and efficient transmission of light energy along the continuous fiber optic path, nor do the novel terminals attenuate such light energy.

It should be borne in mind that this disclosure, in its teaching of the present invention, includes schematic representations which, in the interest of clarity of explanation, are not intended to be exact pictorial representation of actual embodiments of the inventive concept; nor should the illustrative drawings be interpreted in a specifically limiting sense as to the dimensions and the disposition of the several elements illustrated. The fiber optic path, the exposed fibers, the acoustic energy source, the photo-sensitive element, supporting substrate, etc. are not shown to exact scale and may vary considerably in configuration and disposition in variant implementations of the concept of the present invention according to specific choices and combinations of elements, materials, and components as well as the nature of each different application of the teaching of the present invention.

Obviously many modifications and variations of the present invention are possible in the light of the above teachings. It is therefore to be understood that within the scope of the appended claims the invention may be practiced otherwise than as specifically described.

What is claimed is:

1. An optical transmit and receive terminal for controllably coupling light energy out of a continuous fiber optic path comprising:

a light source disposed to transfer light energy for transmission along said continuous fiber optic path;

an acoustic energy source of determinable amplitude and frequency positioned to couple acoustic energy across said continuous fiber optic path for causing commensurate refractive index changes as a function of said amplitude and frequency;

means for selectively controlling the actuation of said source of acoustic energy; and photo-sensitive means positioned proximate to said continuous fiber optic path for receiving light energy laterally diffracted out of said optical path by said refractive index changes and responsive to the diffracted light energy for producing an output signal commensurate with the diffracted light energy received.

2. An optical transmit and receive terminal as claimed in claim 1 wherein said light source is modulated with signal information prior to transmission and said source of acoustic energy is operative to diffract a portion of transmitted light energy out of said continuous fiber optic path sufficient in amplitude for the detection of said signal information by said photo-sensitive means.

3. An optical transmit and receive terminal as claimed in claim 1 wherein said determinable amplitude and frequency of said acoustic energy source is commensurate with signal information for modulating transmitted light energy.

4. An optical transmit and receive terminal as claimed in claim 1 including multiple adjacent acoustic energy sources disposed along said continuous fiber optic path and adapted to be actuated at a sequential rate dependent upon the average velocity of the light energy transmitted along said continuous fiber optic path.

5. An optical transmit and receive terminal as claimed in claim 1 including an acoustic reflector spaced a predetermined distance from the fibers of said fiber optic path and having said acoustic energy source angularly disposed relative to said acoustic reflector for producing multiple reflections of acoustic energy between said acoustic reflector and said continuous fiber optic path.

6. An optical transmit and receive terminal as claimed in claim 1 wherein said continuous fiber optic path comprises individual fibers aligned in side-by-side disposition proximate to said acoustic energy source.

7. An optical transmit and receive terminal as claimed in claim 6 wherein said photo-sensitive means is positioned proximate to said individual fibers of said continuous fiber optic path and substantially opposite said acoustic energy source.

8. An optical transmit and receive terminal as claimed in claim 7 and including an optically reflective means positioned between said individual fibers and said acoustic energy source for reflecting incident light to said photo-sensitive means.

9. An optical transmit and receive terminal as claimed in claim 8 including a second optically reflective means positioned opposite the other optically reflective means and having a window therein for permitting the passage of light energy therethrough to said photo-sensitive means.

* * * * *